United States Patent
Kim et al.

(10) Patent No.: US 9,627,677 B2
(45) Date of Patent: Apr. 18, 2017

(54) RECHARGEABLE BATTERY

(75) Inventors: In Kim, Yongin-si (KR); Duk-Jung Kim, Yongin-si (KR); Joong-Heon Kim, Yongin-si (KR)

(73) Assignees: Samsung SDI Co., Ltd., Yongin-Si, Gyeonggi-do (KR); Robert Bosch GmbH, Stuttgart (DE)

( * ) Notice: Subject to any disclaimer, the term of this patent is extended or adjusted under 35 U.S.C. 154(b) by 654 days.

(21) Appl. No.: 13/469,186

(22) Filed: May 11, 2012

(65) Prior Publication Data

US 2013/0164574 A1    Jun. 27, 2013

Related U.S. Application Data

(60) Provisional application No. 61/579,787, filed on Dec. 23, 2011.

(51) Int. Cl.

| | |
|---|---|
| H01M 2/00 | (2006.01) |
| H01M 2/34 | (2006.01) |
| H01M 2/02 | (2006.01) |
| H01M 2/22 | (2006.01) |
| H01M 10/0525 | (2010.01) |
| H01M 10/0587 | (2010.01) |

(52) U.S. Cl.
CPC .......... *H01M 2/34* (2013.01); *H01M 2/0207* (2013.01); *H01M 2/22* (2013.01); *H01M 10/0525* (2013.01); *H01M 10/0587* (2013.01); *H01M 2200/00* (2013.01)

(58) Field of Classification Search
None
See application file for complete search history.

(56) References Cited

U.S. PATENT DOCUMENTS

| | | | | |
|---|---|---|---|---|
| 6,759,163 B2* | 7/2004 | Frysz et al. | ................... | 429/183 |
| 6,881,514 B2* | 4/2005 | Ahn et al. | ........................ | 429/99 |
| 8,323,813 B2 | 12/2012 | Byun et al. | | |
| 8,586,236 B2 | 11/2013 | Kwak et al. | | |
| 9,023,513 B2 | 5/2015 | Lee et al. | | |
| 2005/0271934 A1* | 12/2005 | Kiger et al. | .................. | 429/159 |
| 2005/0287432 A1* | 12/2005 | Cheon | ..................... | H01M 2/26 |
| | | | | 429/161 |
| 2008/0008927 A1* | 1/2008 | Lee et al. | ......................... | 429/61 |

(Continued)

FOREIGN PATENT DOCUMENTS

| | | | |
|---|---|---|---|
| CN | 102005596 A | 4/2011 | |
| CN | 102005598 A | 4/2011 | |

(Continued)

OTHER PUBLICATIONS

Winters et al. "What Are Batteries, Fuel Cells, and Supercapacitors?" Chemical Reviews. 2004, 104, p. 4245-4269.*

(Continued)

*Primary Examiner* — Patrick Ryan
*Assistant Examiner* — Christopher Domone
(74) *Attorney, Agent, or Firm* — Lee & Morse, P.C.

(57) ABSTRACT

A battery includes a plurality of electrode assemblies arranged in a case, each electrode assembly including a first electrode, a second electrode and a separator between the first electrode and the second electrode, and an interior safety member including an interior plate between the electrode assemblies, the interior safety member being electrically connected to at least one of the plurality of electrode assemblies.

18 Claims, 9 Drawing Sheets

(56) References Cited

U.S. PATENT DOCUMENTS

| | | | |
|---|---|---|---|
| 2009/0072785 A1* | 3/2009 | Moon | 320/112 |
| 2010/0021810 A1* | 1/2010 | Zhu et al. | 429/175 |
| 2010/0279160 A1 | 11/2010 | Lee et al. | |
| 2010/0279170 A1 | 11/2010 | Lee et al. | |
| 2011/0136000 A1 | 6/2011 | Moon et al. | |
| 2011/0136003 A1 | 6/2011 | Kim et al. | |
| 2012/0021274 A1 | 1/2012 | Kim et al. | |

FOREIGN PATENT DOCUMENTS

| | | |
|---|---|---|
| CN | 102097644 A | 6/2011 |
| EP | 2330661 A1 | 6/2011 |
| EP | 2410594 A1 | 1/2012 |
| JP | 2011-049148 A | 3/2011 |
| JP | 2011-119264 A | 6/2011 |
| JP | 2011-119265 A | 6/2011 |
| JP | 2012-028315 A | 2/2012 |
| KR | 10-2008-0005621 A | 1/2008 |
| KR | 10-2010-0082677 A | 7/2010 |
| KR | 10-2011-0022508 A | 3/2011 |
| KR | 10-2011-0065354 A | 6/2011 |
| KR | 10-2011-0065373 A | 6/2011 |
| KR | 10-2011-0072241 A | 6/2011 |

OTHER PUBLICATIONS

S. Santhanagopalan et al., Journal of Power Sources 194 (2009) 550-557, Analysis of internal short-circuit in a lithium ion cell.
European Search Report dated Apr. 22, 2013.
Chinese Office Action dated Feb. 2, 2016 in Corresponding Chinese Patent Application No. 201210563207.
Korean Office Action dated Apr. 20, 2016 in Corresponding Korean Patent Application No. 10-2012-0152465.
Korean Notice of Allowance dated Oct. 25, 2016 in Corresponding Korean Patent Application No. 10-2012-0152465.
Japanese Office Action dated Nov. 7, 2016 in Corresponding Japanese Patent Application No. 2012-280746.

* cited by examiner

RECHARGEABLE BATTERY

CROSS-REFERENCE TO RELATED APPLICATION

The present application claims priority under 35 U.S.C. §119(e) to U.S. Provisional Application No. 61/579,787, filed on Dec. 23, 2011, and entitled: "Rechargeable Battery," which is incorporated herein by reference in its entirety.

BACKGROUND

1. Field

The described technology relates generally to a rechargeable battery.

2. Description of the Related Art

A rechargeable battery is capable of being charged and discharged, unlike a primary battery, which may not be recharged. Low-capacity rechargeable batteries are used for portable compact electronic apparatuses such as mobile phones or notebook computers and camcorders. High-capacity rechargeable batteries are widely used as power sources for driving motors of hybrid vehicles, etc. or for high-capacity storage devices.

Recently, a high-output rechargeable battery using a non-aqueous electrolyte having high energy density has been developed. The high-output rechargeable battery is configured with a high-capacity battery module by connecting a plurality of rechargeable batteries in series so as to be used for driving a motor for an apparatus requiring a large amount of power, i.e., an electrical vehicle, etc. The rechargeable battery may have a cylindrical shape, an angular shape, and the like.

The above information disclosed in this Background section is only for enhancement of understanding of the background of the described technology and therefore it may contain information that does not form the prior art that is already known in this country to a person of ordinary skill in the art.

SUMMARY

According to an embodiment, there is provided a battery, including a plurality of electrode assemblies arranged in a case, each electrode assembly including a first electrode, a second electrode and a separator between the first electrode and the second electrode, and an interior safety member including an interior plate between the electrode assemblies, the interior safety member being electrically connected to at least one of the plurality of electrode assemblies.

The interior safety member may be electrically connected to the second electrode of the at least one of the plurality of electrode assemblies.

The second electrode may include an active material coated on a metal plate. The metal plate of the second electrode and the interior plate of the interior safety member may be formed of a same metal. The metal plate of the second electrode and the interior plate of the interior safety member may be formed of copper.

The first electrode, second electrode and separator of each electrode assembly may be wound or stacked together such that an outermost facing electrode of each electrode assembly may be the second electrode.

The first electrode and the second electrode of each electrode assembly may respectively include a first electrode uncoated region and a second electrode uncoated region. The interior safety member may include a connection portion that projects from an end of the interior plate to electrically connect to the second electrode uncoated region of the at least one of the plurality of electrode assemblies.

The interior plate of the interior safety member may extend between adjacent ones of the electrode assemblies. The connection portion may include a first connection portion that connects to the second electrode uncoated region of one of the adjacent ones of the electrode assemblies and a second connection portion that connects to the second electrode uncoated region of another of the adjacent ones of the electrode assemblies.

The first connection portion and the second connection portion may extend from the end of the interior plate along an entire height of the interior plate.

The first connection portion and the second connection portion may each extend from the end of the interior plate along only a part of an entire height of the interior plate. The first connection portion and the second connection portion may be spaced apart from each other in a height direction of the interior plate.

The first connection portion and the second connection portion of the connection portion may have a continuous, serpentine configuration. The connection portion may include a connection plate connecting the first connection portion and the second connection portion.

The battery may include more than two of the electrode assemblies and a plurality of the interior safety members.

The interior plate of the interior safety member may include facing surfaces that face the adjacent ones of the electrode assemblies. The adjacent ones of the electrode assemblies may include outer side surfaces that face the facing surfaces of the interior plate. The facing surfaces of the interior plate may have a length and height that substantially correspond to a length and height of the outer side surfaces of the adjacent ones of the electrode assemblies.

The interior safety member may include an insulation film that insulates the facing surfaces of the interior plate from the outer side surfaces of the adjacent ones of the electrode assemblies.

The plurality of electrode assemblies may be arranged inside the case to include a first end one of the electrode assemblies and a second end one of the electrode assemblies. The battery may further include a first end safety member including a first end plate between the first end one of the electrode assemblies and a first inner side of the case, and a first end connection portion electrically connected to the second electrode uncoated region of the first end one of electrode assemblies, and a second end safety member including a second end plate between the second end one of the electrode assemblies and a second inner side of the case, and a second end connection portion electrically connected to the second electrode uncoated region of the second end one of the electrode assemblies. The first end plate and the second end plate may be made of copper.

The first end plate and the second end plate may each include a facing surface that faces a respective one of the first end one and the second end one of the electrode assemblies. The first end plate and the second end plate may each have a length and height that substantially correspond to a length and height of the electrode assemblies.

The first end safety member and the second end safety member may each include an insulation film that electrically insulates the facing surface of the first end plate and the second end plate from the respective one of the first end one and the second end one of the electrode assemblies.

The first electrode of the electrode assemblies may be electrically connected to the case. The second electrode of the electrode assemblies, the interior safety member, the first end safety member and the second end safety member may be electrically insulated from the case.

The battery may further include a first electrode terminal, a first current collector electrically connecting the first electrode terminal and the first electrode, a second electrode terminal, and a second current collector electrically connecting the second electrode terminal and the second electrode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
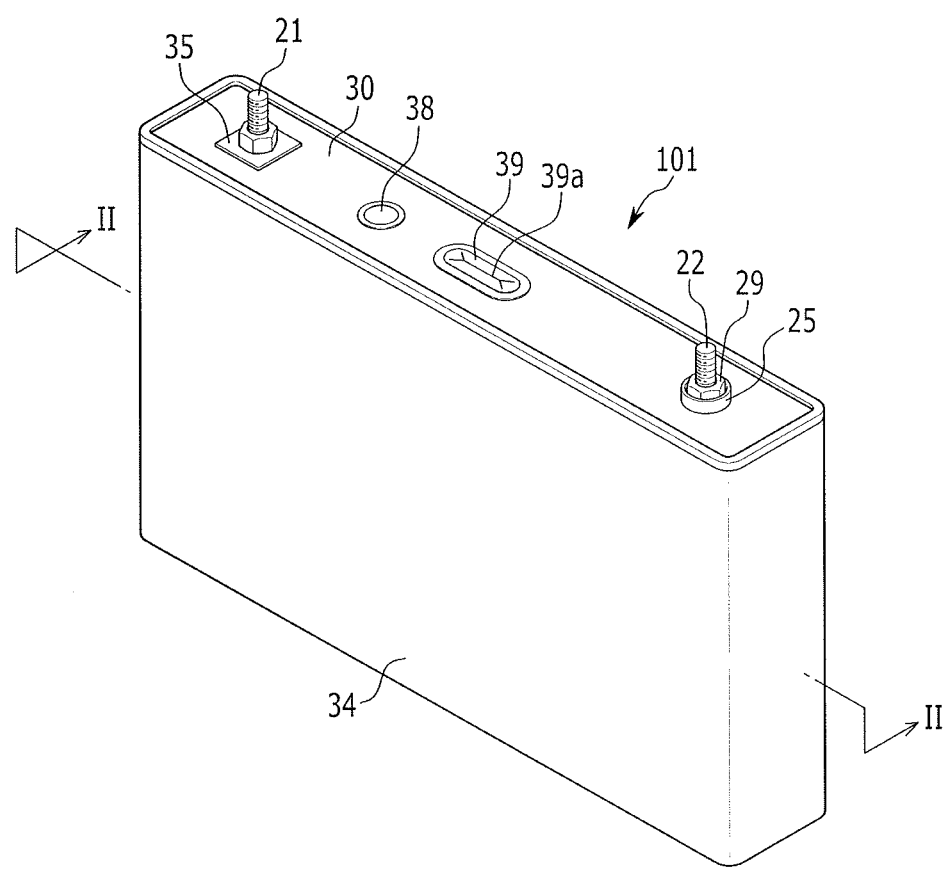
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
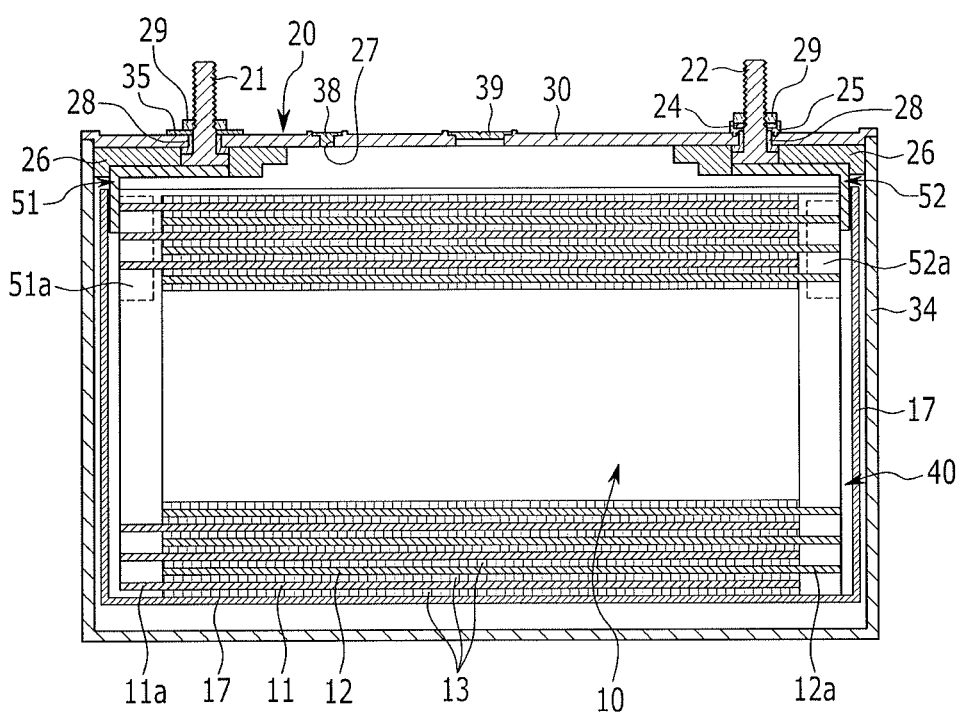
FIG. 2 illustrates a cross-sectional view taken along the line II-II of FIG. 1.

FIG. 1 is a perspective view of a rechargeable battery according to an exemplary embodiment, and FIG. 2 is a cross-sectional view taken along the line II-II of FIG. 1.

Referring to FIG. 1 and FIG. 2, a rechargeable battery 101 according to the exemplary embodiment includes a plurality of electrode assemblies 10 formed by winding a positive electrode 11 and a negative electrode 12 while interposing a separator 13 therebetween, a case 34 in which the electrode assemblies 10 are installed, and a cap assembly 20 coupled to an opening of the case 34.

The rechargeable battery 101 according to FIG. 1 is shown as being formed in a square shape. In other implementations, various other types of batteries including a lithium polymer battery or a cylindrical battery may be used.

The positive electrode 11 includes a positive coating region where an active material is coated to a current collector formed of a thin metal foil made of aluminum etc, and a positive uncoated region 11a where the active material is not coated. The negative electrode 12 includes a negative coating region where the active material is coated to a current collector formed of a thin metal foil made of copper etc., and a negative uncoated region 12a where the active material is not coated.

The positive electrode 11 may be connected to the case 34, and the negative electrode 12 may be connected to safety members 41, 42, and 43. In such an instance, the positive electrode 11 may be referred to as a "second electrode" and the negative electrode 12 may be referred to as a "first electrode." In other implementations, the positive electrode 11 may be the first electrode, connected to safety members 41, 42, 43, and the negative electrode 12 may be the second electrode, connected to the case 34.

In the present exemplary embodiment, four electrode assemblies 10 may be installed inside the case 34. In other implementations, other numbers of the electrode assemblies 10 may be installed inside the case 34.

The positive uncoated region 11a may be formed at one side end of the positive electrode 11 according to the length direction of the positive electrode 11, and the negative uncoated region 12a may be formed at the other side end of the negative electrode 12 according to the length direction of the negative electrode 12. After the insulating separator 13 is interposed between the positive and negative electrodes 11 and 12, the electrodes 11 and 12 and the separator 13 may be spirally wound. Moreover, a finishing tape (not shown) supporting the shape of the electrode assembly 10 may be attached to an outer surface of the electrode assembly 10.

In other implementations, the electrode assembly 10 may have a structure in which the positive electrode and the negative electrode are formed as a plurality of sheets and are alternately laminated with the separator interposed therebetween.

The case 34 may be formed as a substantially rectangular parallelepiped and may have an opening on one surface thereof. An insulating encapsulation 17 for insulation may be installed between the case 34 and the electrode assemblies 10. The insulating encapsulation 17 may have a film shape, and the top of the insulating encapsulation 17 may be open.

The cap assembly 20 may include a cap plate 30 covering the opening of the case 34, a positive terminal 21 that protrudes outwardly from the cap plate 30 and is electrically connected with the positive electrode 11, a negative terminal 22 that protrudes outwardly from the cap plate and is electrically connected with the negative electrode, and a vent member 39 with a notch 39a so as to fracture depending on a set internal pressure.

The cap plate 30 may be formed as a thin sheet. An electrolyte injection hole 27 for injecting an electrolyte may be formed at one side, and a sealing plug 38 may be installed in the electrolyte injection hole 27.

A lower gasket 28 maybe installed between the cap plate 30 and the terminals 21 and 22 to seal the space between the cap plate 30 and the terminals 21 and 22. (Herein, for convenience, the phrase "the terminals 21 and 22" may be used to refer collectively to the positive terminal 21 and the negative terminal 22).

The lower gasket 28 may into a terminal hole and may be closely disposed on the bottom of the cap plate 30. The terminals 21 and 22 may have a cylindrical shape. Nuts 29 supporting the terminals 21 and 22 on the top may be installed at the terminals 21 and 22, and threads may be formed on the outer peripheries of the terminals so that the nuts 29 may be fastened to the outer peripheries of the terminals 21 and 22.

The positive terminal 21 may be inserted into a connection plate 35. The connection plate 35 may be installed between the nut 29 and the cap plate 30 to electrically connect the positive terminal 21 with the cap plate 30. As a result, the cap plate 30 and the case 34 may be electrically connected to the positive electrode 11.

An upper gasket 25 may be installed around the negative terminal 22. The upper gasket 25 may be disposed on the lower gasket 28 to contact the top of the cap plate 30 and to insulate the negative terminal 22 and the cap plate 30 from each other. A washer 24 buffering the fastening force between the nut 29 and the upper gasket 25 may be installed on the upper gasket 25.

A lower insulation member 26 may be installed around the terminals 21 and 22 underneath the cap plate 30.

A current collecting member 51 electrically connected with the positive electrode 11 may be attached to the positive terminal 21 by welding. The positive terminal 21 and the current collecting member 51 may fit into a groove that is formed on the bottom of the lower insulation member 26. The current collecting member 51 may be equipped with a plurality of tabs 51a that protrude downward. The plurality of tabs 51a may be attached to the positive uncoated region 11a by welding.

A current collecting member 52 electrically connected with the negative electrode 12 may be attached to the negative terminal 22 by welding. The negative terminal 22 and the current collecting member 52 may fit into a groove that is formed on the bottom of the lower insulation member 26. The current collecting member 52 may be equipped with a plurality of tabs 52a that protrude downward. The plurality of tabs 52a may be attached to the negative uncoated region 12a by welding.

Safety members electrically connected to the negative electrode 12 may be installed between the electrode assemblies 10 and may be disposed outside the outer surface of the electrode assemblies 10.

Figure 3:
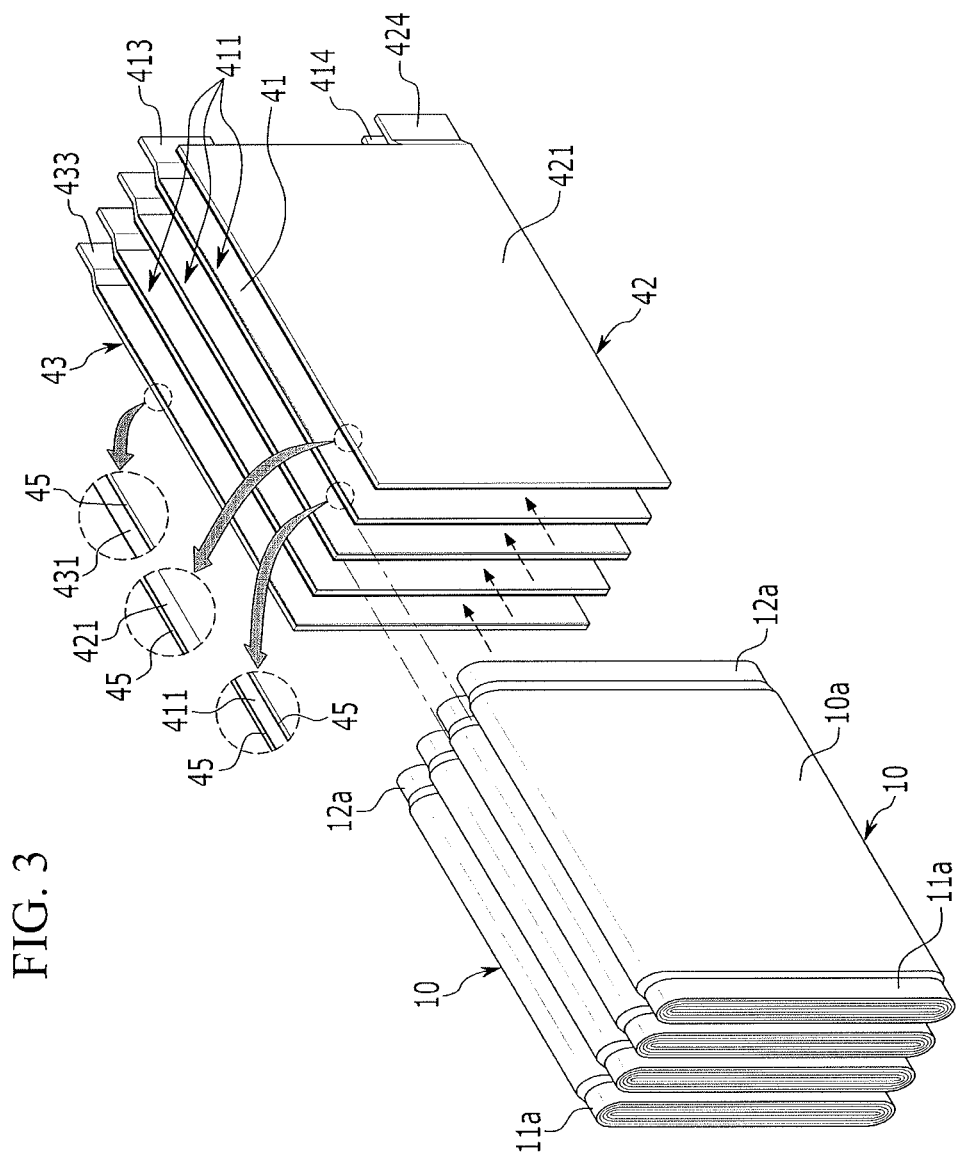
FIG. 3 illustrates an exploded perspective view of an electrode assembly and a safety member according to the exemplary embodiment.
Figure 4:
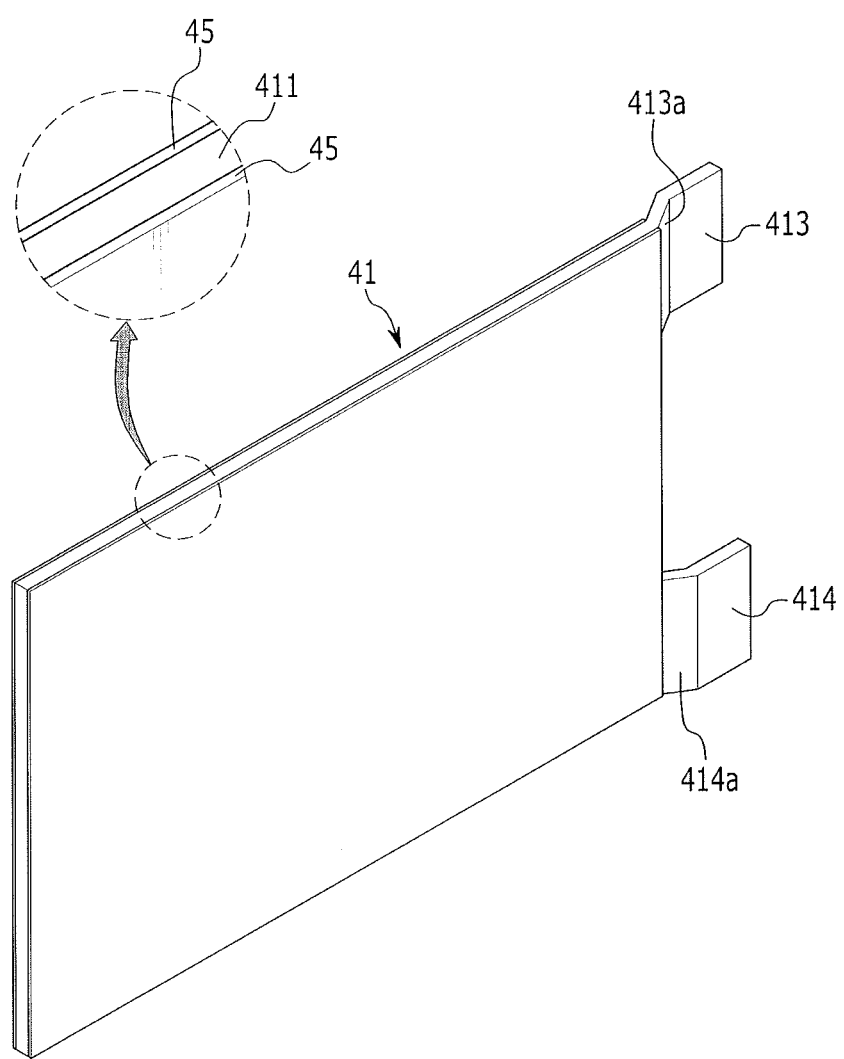
FIG. 4 illustrates a perspective view of the first safety member.

FIG. 3 is an exploded perspective view of an electrode assembly and a safety member according to an exemplary embodiment, and FIG. 4 is a perspective view of the first safety member.

Referring to FIG. 3 and FIG. 4, the safety member may include the at least one interior safety member 41 disposed between the electrode assemblies 10, a first end safety member 42 disposed at one side end of the electrode assemblies 10, and a second end safety member 43 disposed at the other side end of the electrode assemblies 10.

In other implementations, the first end safety member 42 and the second end safety member 43 may be omitted.

According to the present exemplary embodiment, each of the interior safety members 41 may be disposed between the two neighboring electrode assemblies of the four electrode assemblies 10 such that both surfaces thereof contact the neighboring electrode assemblies.

In other implementations, only one interior safety member 41 may be disposed with respect to the four electrode assemblies. Such an interior safety member 41 may be disposed between the two neighboring electrode assemblies of the four electrode assemblies 10.

The interior safety member 41 may include an interior plate 411 attached to a flat surface 10a widely formed in the electrode assembly 10. The interior safety member 41 may include at least one of a first connection portion 413 and a second connection portion 414 connected to and formed at the interior plate 411 and attached to the negative uncoated region 12a.

The interior plate 411, the first connection portion 413, and the second connection portion 414, may be made of a metal having conductivity, such as copper or stainless steel. The interior plate 411, the first connection portion 413, and the second connection portion 414 according to the present exemplary embodiment may be integrally formed. The first connection portion 413 and the second connection portion 414 may be separately disposed in the height direction of the interior plate 411 such that the first connection portion 413 is formed on an upper part of one side end of the interior plate 411 and the second connection portion 414 is formed on a lower part of the one side end of the interior plate 411.

The first connection portion 413 may bend toward the negative uncoated region 12a of one electrode assembly 10 among the neighboring electrode assemblies 10, and the second connection portion 414 may bend toward the uncoated region of the other electrode assembly 10 among the neighboring electrode assemblies 10. Accordingly, the first connection portion 413 and the second connection portion 414 separately disposed in the height direction of the interior plate 411 may protrude in different directions with respect to a thickness direction of the interior plate 411.

The first connection portion 413 may have an inclination portion that bends obliquely toward one negative uncoated region 12a from the interior plate 411 and a welding portion that bends from the inclination portion and parallel to the interior plate 411. The second connection portion 414 may have an inclination portion that bends obliquely toward the other negative uncoated region 12a from the interior plate 411 and a welding portion that bends from the inclination portion and parallel to the interior plate.

The first connection portion 413 and the second connection portion 414 may be welded to the neighboring negative uncoated regions 12a to be electrically connected to the negative uncoated region 12a. Accordingly, the interior safety member 41 may be electrically connected to the negative electrodes 12 of two electrode assemblies 10 disposed at both sides.

In other implementations, one of the first connection portion 413 and the second connection portion 414 may be welded to the negative uncoated portion 12a and electrically connected to the negative electrode 12 of the electrode assembly 10.

An insulating film 45 may be attached and installed on both surfaces of the interior plate 411 contacting the electrode assembly 10. The insulation film 45 may be made of a polymer and may serve to prevent the positive electrode 11 of the electrode assembly 10 and the interior safety member 41 from being electrically connected with each other.

The first end safety member 42 may be installed to contact the outer surface of an electrode assembly 10 disposed at a side end of the electrode assemblies 10. The first end safety member 42 may include a first end plate 421 attached to the flat surface 10a toward the outside of the electrode assembly 10, and a connection portion 424 formed and connected to the first end plate 421 and attached to the negative uncoated region 12a.

Herein, the term "flat surface 10a" with respect to an electrode assembly 10 may refer to an outside planar surface of the electrode assembly 10, and may exclude a curved portion of an upper end and a lower end along the outer surface of the electrode assembly 10.

The first end plate 421 and the connection portion 424 may be made of a metal having conductivity, such as copper or stainless steel. The first end plate 421 and the connection portion 424 according to the present exemplary embodiment may be integrally formed. The connection portion 424 may be formed at a lower part of one side end of the side plate 421.

The connection portion 424 may bend toward the negative uncoated region 12a of the neighboring electrode assembly 10 at the side end of the electrode assemblies 10. The connection portion 424 may include the inclination portion, which may bend obliquely from the first end plate 421 and the welding portion, which may bend from the inclination portion and may be formed to be parallel to the first plate 421. The connection portion 424 may be welded to the negative uncoated region 12a to be electrically connected with the negative uncoated region 12a, and may support the negative uncoated region 12a to prevent the negative uncoated region 12a from wobbling by external shock or vibration.

The insulating film 45 may be attached to a surface of the first end plate 421 that contacts the electrode assembly 10. The insulation film 45 may be made of a polymer and may serve to prevent the positive electrode of the electrode assembly 10 and the first end safety member 42 from being electrically connected to each other.

The second end safety member 43 may be installed to contact the outer surface of an electrode assembly 10 disposed at a second side end of the electrode assemblies 10. The second end safety member 43 may include a second end plate 431 attached to the flat surface 10a toward the outside of the electrode assembly 10 and a connection portion 433 formed and connected to the second end plate 431 and attached to the negative uncoated region 12a.

The second end plate 431 and the connection portion 433 may be made of a metal having conductivity such as copper or stainless steel. The second end plate 431 and the connection portion 433 according to the present exemplary embodiment may be integrally formed, and the connection portion 433 may be formed on one side end of the second end plate 431.

The connection portion 414 may bend toward the negative uncoated region 12a of the neighboring electrode assembly 10. The connection portion 414 may have an inclination portion that bends obliquely from the second end plate 431 and a portion that bends from the inclination portion and is formed parallel to the second end plate 431. The connection portion may be welded to the negative uncoated region 12a to be electrically connected to the negative uncoated region 12a. The connection portion 433 of the second end safety member 43 may be obliquely formed in a direction opposite to the direction of the connection portion 424 of the first end safety member 42.

An insulating film 45 may be attached to a surface of the second end plate 431 that contacts the electrode assembly 10. The insulation film 45 may be made of a polymer and may serve to prevent the positive electrode of the electrode assembly 10 and the second end safety member 43 from being electrically connected to each other.

The current collecting member 52 may be welded to the negative uncoated region 12a at parts of the negative uncoated region 12a where the connection portions are not formed. In other implementations, a tab 52a of the current collecting member 52 may be welded to the connection portion.

In some implementations, the first end safety member 42 and the second end safety member 43 contacting the outer surface of the electrode assemblies 10 disposed at the opposite side ends among the electrode assemblies 10 may be omitted.

Figure 5:
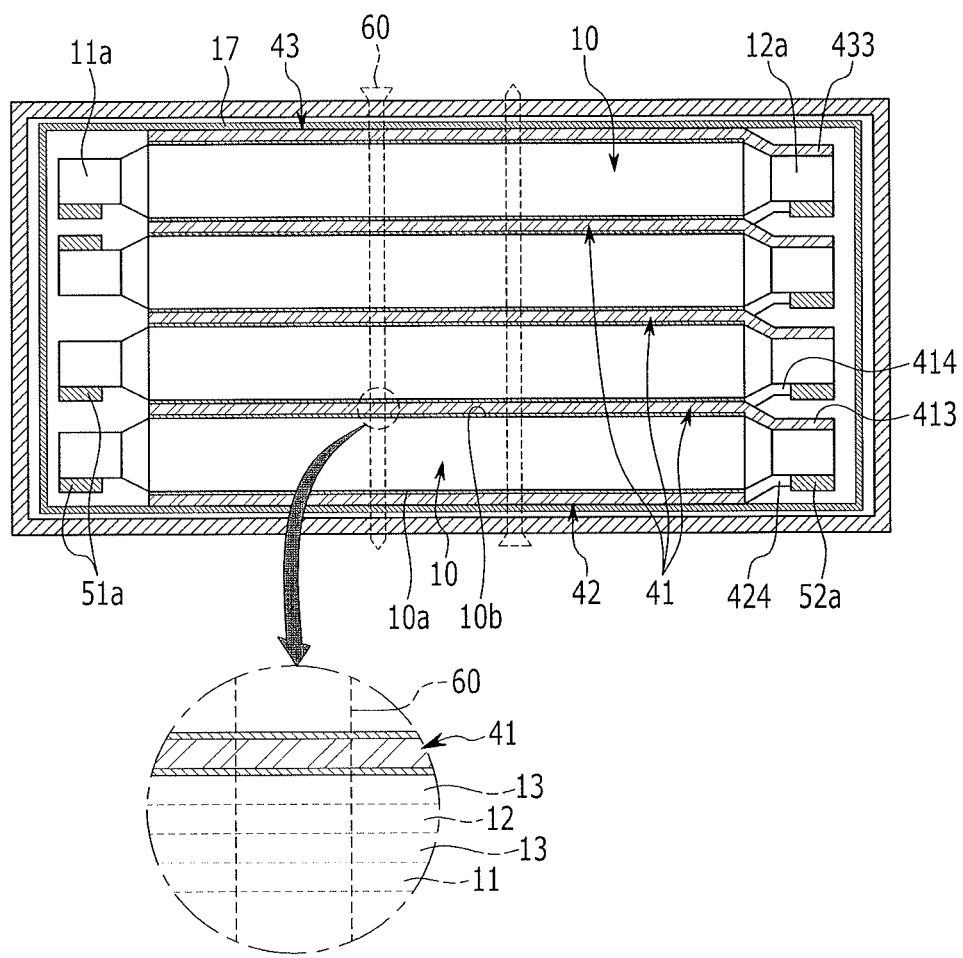
FIG. 5 illustrates a horizontal cross-sectional view of a rechargeable battery according to the exemplary embodiment.

In a typical rechargeable battery, when a conductive foreign material, such as a nail, penetrates from the outside of the rechargeable battery 101 due to shock or an accident, the positive electrode and the negative electrode may short-circuit each other through the conductive foreign material. Excessive heat may be generated in the rechargeable battery 101, which may explode or combust. However, as described in the exemplary embodiment and as shown in FIG. 5, when a conductive foreign material 60 penetrates from the outside of the rechargeable battery 101 in which the safety member is installed, the interior plate of the interior safety member 41 or the second end plate of the second end safety member 42 and the case 34 may short circuit each other, so that it may be possible to safely discharge the charged current.

According to embodiments, the positive and negative electrodes 11 and 12 and the separator 13 may be spirally wound such that the negative electrode 12 is be disposed on the outermost surface of the electrode assemblies 10. Accordingly, the interior safety members 41 and the negative electrodes 12 may be disposed on respective sides of the separator 13 to face each other.

A foreign conductive material 60 that penetrates the rechargeable battery from the outside may penetrate the interior safety member 41 and the negative electrode 12 first in sequence, before penetrating the positive electrode 11.

The interior safety member 41 may absorb heat that may be generated between the conductive foreign material 60 and the negative electrode 12, and an increase in an inside temperature of the electrode assembly 10 may be suppressed.

The interior safety member 41 may be formed of copper.

As such, according to the exemplary embodiment, when a foreign material 60 penetrates the rechargeable battery 101 to cause a short circuit, current may be discharged to remove a combustion risk, and heat may be absorbed by the safety members 41, 42, 43, thereby improving the safety of the rechargeable battery 10.

When the foreign material 60 penetrates the rechargeable battery 101 from either side of the rechargeable battery 101, the current charged to the electrode assembly 10 may be rapidly discharged regardless of the direction from which the foreign material 60 penetrates.

In the present exemplary embodiment, if the electrode assemblies 10 between which the interior safety member 41 is positioned are all electrically connected, then regardless of the direction from which the foreign material 60 penetrates, the safety members 41, 42, 43 may be first contacted such that that the positive electrode 11 and the negative electrode 12 are prevented from being directly short-circuited by the foreign material 60, thereby improving the safety of the rechargeable battery 101.

In other implementations, the interior safety member 41 may be electrically connected to one of the neighboring electrode assemblies 10.

Figure 6:
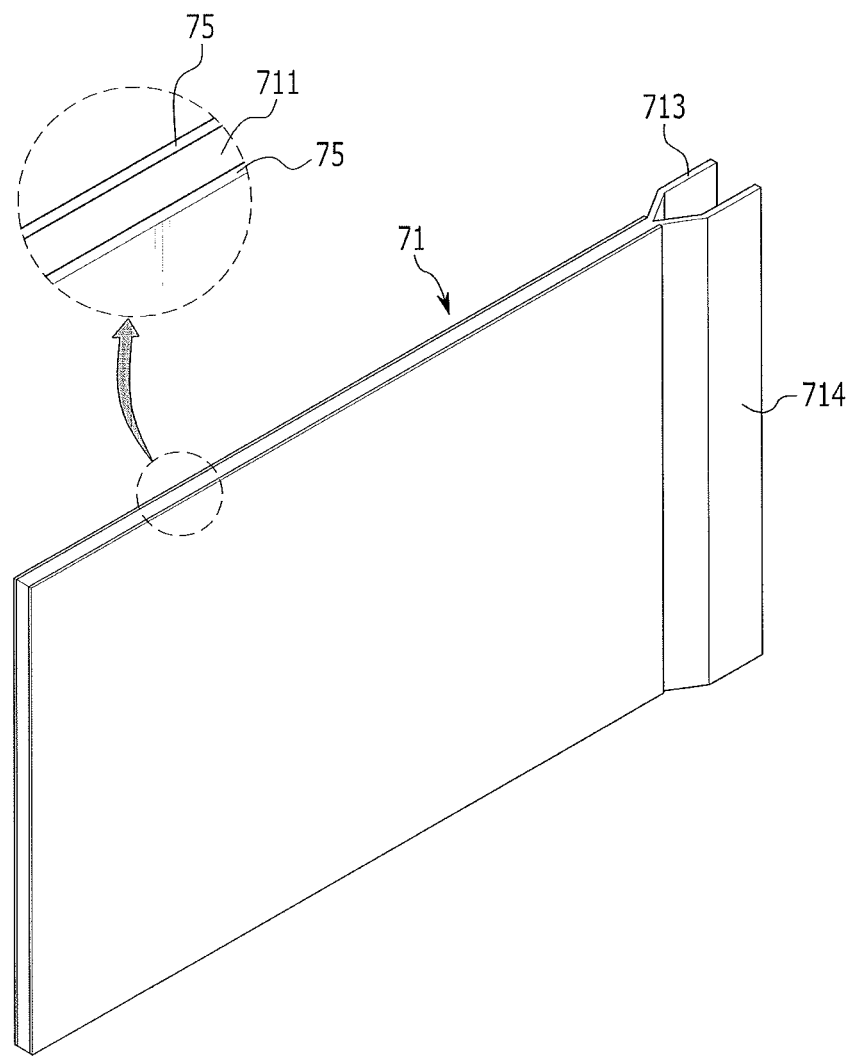
FIG. 6 illustrates a perspective view of the first safety member of a rechargeable battery according to another exemplary embodiment.

FIG. 6 is a perspective view of the interior safety member of a rechargeable battery according to another exemplary embodiment.

The rechargeable battery according to the present exemplary embodiment is the same as the rechargeable battery 101 according to the exemplary embodiment of FIGS. 1 to 5, except for the structure of the interior safety member 71 such that the overlapping description of the same structure is not repeated.

Referring to FIG. 6, the interior safety member 71 according to the present exemplary embodiment may be disposed between the electrode assemblies 10 such that both surfaces contact the neighboring electrode assemblies 10. The interior safety member 71 may include an interior plate 711 attached to the widely formed flat surfaces 10a of the neighboring electrode assemblies 10, and at least one of a first connection portion 713 and a second connection portion 714 connected and formed at the interior plate 711 to be attached to the negative uncoated regions 12a of the neighboring electrode assemblies 10.

The interior plate 711, and the first connection portion 713 and the second connection portion 714 may be made of a metal having conductivity, such as copper or stainless steel. The interior plate 711, the first connection portion 713, and the second connection portion 714 according to the present exemplary embodiment may be integrally formed. In other implementations, the second connection portion 714 may be attached to the interior plate 711 or the first connection portion 713 though a welding method.

The first connection portion 713 and the second connection portion 714 may be formed at one side end of the interior plate 711, and the first connection portion 713 and the second connection portion 714 may be connected in the height direction of the interior plate 711. The first connection portion 714 and the second connection portion 714 may protrude from the interior plate 711, and may be divided at the side end of the interior plate 711. The first connection portion 714 and the second connection portion 714 may protrude from the interior plate 711 along an entire height of the interior plate 711 at the one side end. Accordingly, the first connection portion 713 and the second connection portion 714 may be easily connected to the interior plate 711.

The first connection portion 713 may bend toward the negative uncoated region 12a of one electrode assembly 10 among the neighboring electrode assemblies 10, and the second connection portion 714 may bend toward the negative uncoated region 12a of the other electrode assembly 10 of the neighboring electrode assembly 10. Accordingly, the first connection portion 713 and the second connection portion 714 protrude in different directions with respect to the thickness direction of the interior plate 711.

The first connection portion 713 may include an inclination portion that bends obliquely toward one negative uncoated region 12a from the interior plate 711 and a welding portion that bends from the inclination portion and is parallel to the side plate. The second connection portion 714 may include an inclination portion that bends obliquely toward the other negative uncoated region 12a and a welding portion that bends from the inclination portion and is parallel to the side plate.

The inclination portion of the first connection portion 713 and the inclination portion of the second connection portion 714 may protrude in the side directions and the welding portion of the first connection portion 713 and the welding portion of the second connection portion 714 may be parallel to each other.

The first connection portion 713 and the second connection portion 714 may be welded to the neighboring negative uncoated regions 12a to be electrically connected to the negative uncoated regions 12a. Thereby, the interior plate 711 may be electrically connected to the negative electrode 12 of two electrode assemblies 10 disposed at respective sides of the interior plate 711.

In other implementations, one of the first connection portion 713 and the second connection portion 714 may be welded to the negative uncoated portion 12a and electrically connected to the negative electrode 12 of the electrode assembly.

An insulating film 75 may be attached to both surfaces of the interior plate contacting the neighboring electrode assemblies 10. The insulation film 75 may be made of a polymer and may serve to prevent the positive electrodes 11 of the electrode assemblies 10 and the safety member 71 from being electrically connected with each other.

Figure 7:
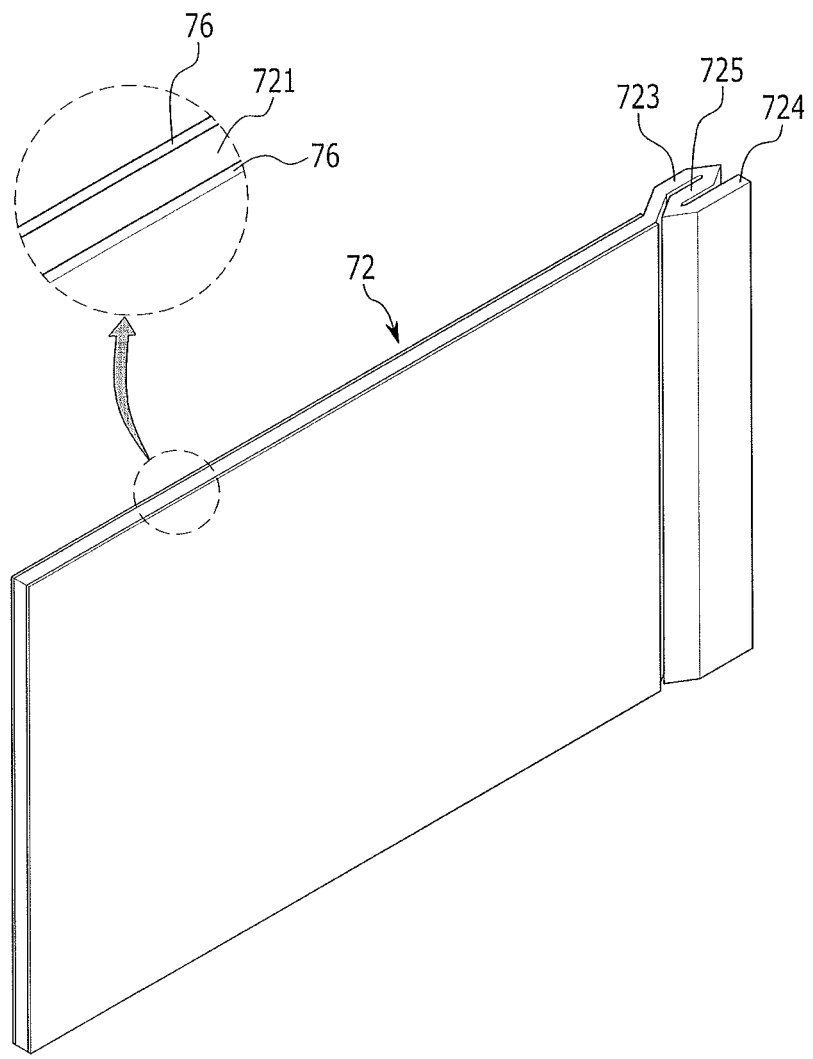
FIG. 7 illustrates a perspective view of the first safety member of a rechargeable battery according to another exemplary embodiment.

FIG. 7 is a perspective view of the interior safety member of a rechargeable battery according to another exemplary embodiment.

The rechargeable battery according to the present exemplary embodiment has the same structure as the rechargeable battery according to the previous exemplary embodiments except for the interior safety member 72, such that the overlapping description is not repeated.

Referring to FIG. 7, the interior safety member 72 may be disposed between neighboring electrode assemblies 10 such that both surfaces thereof contact the neighboring electrode assemblies to. The interior safety member 72 may include an interior plate 721 attached to the widely formed flat surfaces 10a of the neighboring electrode assemblies 10, and at least one of the first connection portion 723 and the second connection portion 724 may be connected to and formed at the interior 721 plate to be attached to the negative uncoated regions 12a.

The interior plate 721, and the first connection portion 723 and the second connection portion 724, may be made of a metal having conductivity such as copper or stainless steel. The interior plate 721, the first connection portion 723, and the second connection portion 724 according to the present exemplary embodiment may be integrally formed. In other implementations, the second connection portion 724 may be attached to the interior plate 721 or the first connection portion 723 by welding.

The first connection portion 723 may be connected at one side end of the interior plate 721, in the height direction of the interior plate 721. The second connection portion 724 may bend from the first connection portion 723. A connection plate 725 connecting the first connection portion 723 and the second connection portion 724 may be formed between the first connection portion 723 and the second connection portion 724.

The first connection portion 723, the connection plate 725 and the second connection portion 724, may bend sequentially in a zigzag shape. The interior plate 721 may have a thickness of less than about 80 μm such that the first connection portion 723 and the second connection portion 724 may easily bend.

Accordingly, the first connection portion 723 and the second connection portion 724 may protrude in different directions with respect to the thickness direction of interior plate 721 via the connection plate 725 interposed therebetween.

The first connection portion 723 may be welded to the negative uncoated region 12a of an electrode assembly 10 positioned at one side of the interior safety member 72, and the second connection portion 724 may be welded to the negative uncoated region 12a of the electrode assembly 10 positioned at the other side of the interior safety member 72. Accordingly, the interior plate 721 may be electrically connected to the negative electrode 12 of two electrode assemblies 10 disposed at respective sides.

In other implementations, one of the first connection portion 723 and the second connection portion 724 may be welded to the negative uncoated portion 12a and electrically connected to the negative electrode 12 of the electrode assembly 10.

In the interior plate 721, an insulating film 76 may be attached to both surfaces contacting the neighboring electrode assemblies 10. The insulation film 76 may be made of a polymer and may serve to prevent the positive electrode of the electrode assembly 10 and the interior safety member 72 from being electrically connected with each other.

Figure 8:
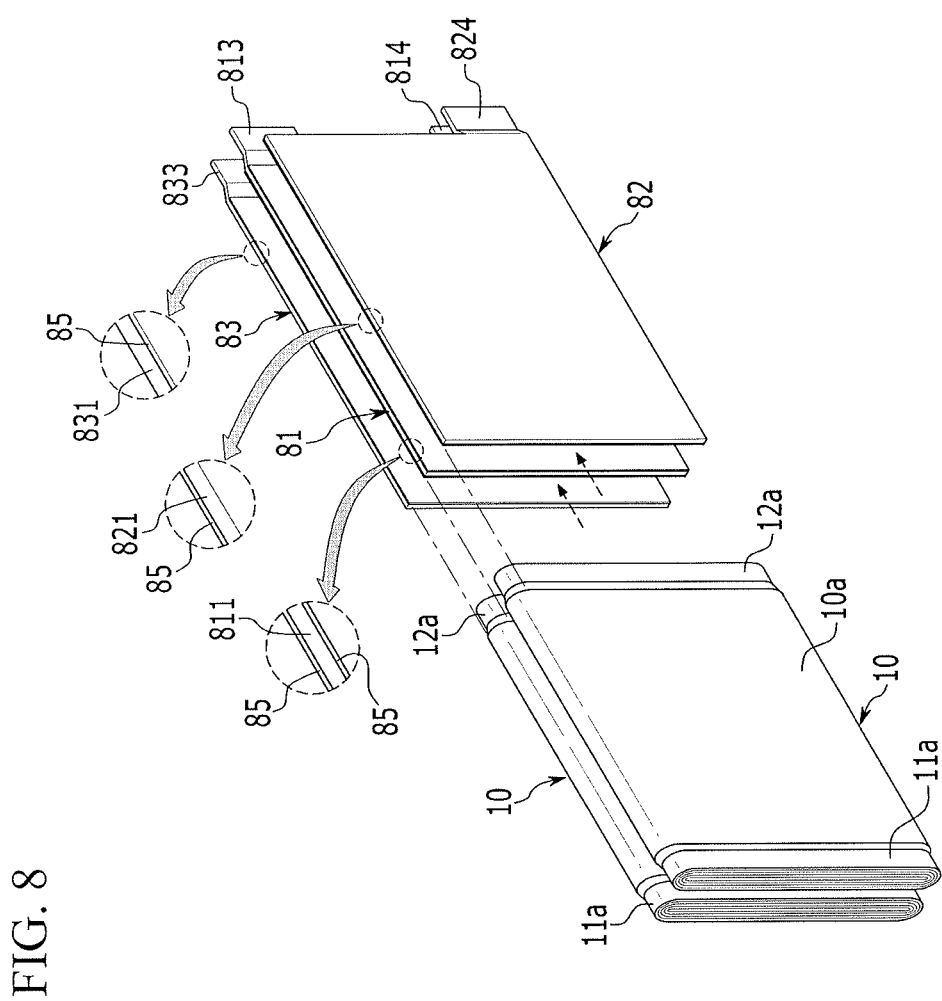
FIG. 8 illustrates a perspective view of a safety member of a rechargeable battery according to another exemplary embodiment.
Figure 9:
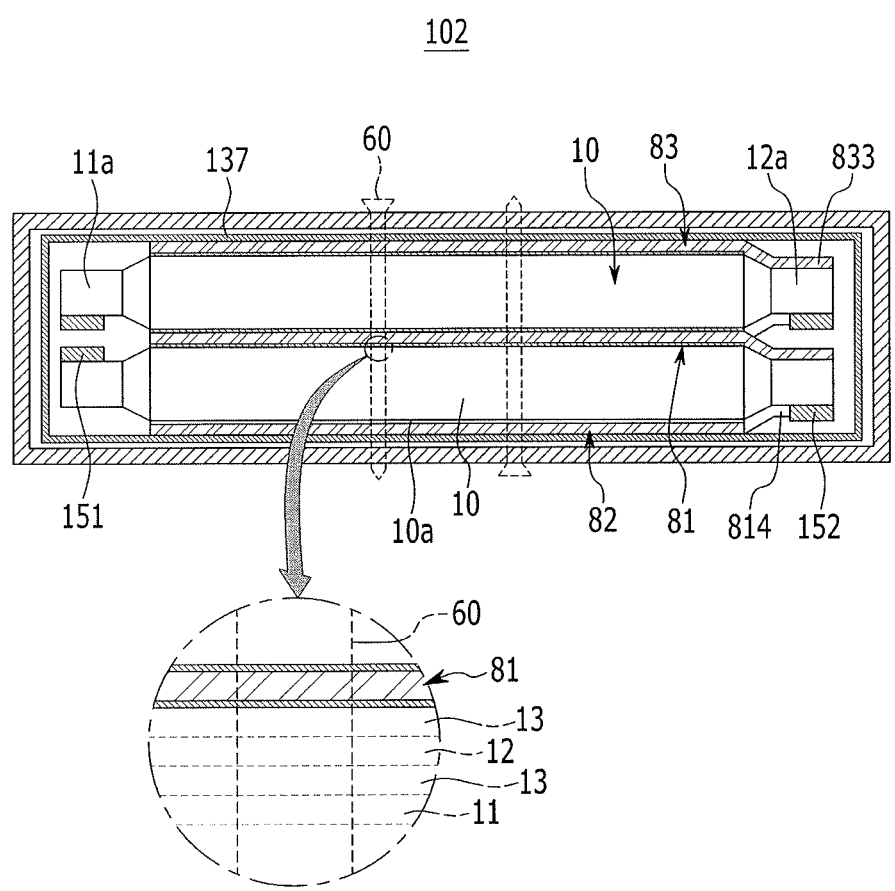
FIG. 9 illustrates a cross-sectional view of a rechargeable battery according to the exemplary embodiment of FIG. 9.

FIG. 8 is a perspective view of a safety member of a rechargeable battery according to another exemplary embodiment, and FIG. 9 is a cross-sectional view of a rechargeable battery according to the exemplary embodiment.

The rechargeable battery 102 according to the present exemplary embodiment has the same structure as the rechargeable battery according to the previous exemplary embodiments except for the number of electrode assemblies 10 inserted inside the case 134 and the number of safety members, such that the overlapping description is not repeated.

Referring to FIG. 8 and FIG. 9, the rechargeable battery 102 according to the present exemplary embodiment may include a case 134, two electrode assemblies 10 inserted inside the case 134, and a safety member disposed between the electrode assemblies 10 and the outside of the electrode assemblies 10.

Each of the electrode assemblies may include a positive uncoated region 11a at one side end of the electrode assembly 10, and a negative uncoated region 12a at the other side end. A current collecting member 151 electrically connecting the positive electrode and the positive terminal may be installed in the positive uncoated region 11a, and the current collecting member 152 electrically connecting the negative electrode and the negative terminal may be installed in the negative uncoated region. An insulating encapsulation 137 may be installed between the case 134 and the electrode assemblies 10. The insulating encapsulation 137 may have a film shape, and the upper portion thereof may be opened.

The safety member may include an interior safety member 81 disposed between the electrode assemblies 10 deposited, a first end safety member 82 disposed at one side end of the electrode assemblies 10, and a second end safety member 83 disposed at the other end of the electrode assemblies 10.

In other implementations, the first end safety member 82 and the second end safety member 83 may be omitted.

The interior safety member 81 may be disposed between the electrode assemblies 10 such that both surfaces thereof contact the neighboring electrode assemblies 10. The interior safety member 81 may include an interior plate 811 attached to a widely formed flat surface 10a of each electrode assembly 10, and at least one of a first connection portion 813 and a second connection portion 814 connected and formed at the side plate 811 and attached to the negative uncoated region 12a of one of the neighboring electrode assemblies 10.

The interior plate 811, and the first connection portion 813 and the second connection portion 814, may be made of a metal having conductivity, such as copper or stainless steel. The interior plate 811, the first connection portion 813, and the second connection portion 814 according to the present exemplary embodiment may be integrally formed. The first connection portion 813 may be formed on an upper part of one side end of the interior plate 811 and the second connection portion 814 may be formed on a lower part of the one side end of the interior plate 811.

The first connection portion 813 may bend toward the negative uncoated region 12a of one electrode assembly 10 among the neighboring electrode assemblies 10, and the second connection portion 814 may bend toward the negative uncoated region 12a of the other electrode assembly 10 among the neighboring electrode assemblies 10. Accordingly, the first connection portion 813 and the second connection portion 814 may be separately disposed in the height direction of the interior plate 811 and may protrude in different directions with respect to a thickness direction of the interior plate 411.

The first connection portion 813 may have an inclination portion that obliquely bends toward the negative uncoated region 12a of one electrode assembly 10 from the interior plate 811 and a welding portion that bends from the inclination portion and that is parallel to the interior plate 811. The second connection portion 814 may have an inclination portion that obliquely bends toward the negative uncoated region 12a of the other electrode assembly 10 from the interior plate 811 and a welding portion that bends from the inclination portion and that is parallel to the interior plate 811.

The first connection portion 813 and the second connection portion 814 may be bound to the neighboring negative uncoated regions 12a to be electrically connected to the negative uncoated region 12a. Accordingly, the interior safety member 81 may be electrically connected to the negative electrodes 12 of two electrode assemblies 10 disposed at respective sides of the interior safety member 81.

In other implementations, one of the first connection portion 813 and the second connection portion 814 may be welded to one of the negative uncoated portions 12a and electrically connected to the negative electrode 12 of one of the electrode assemblies 10.

An insulating film 85 may be attached to both surfaces of the interior plate 811 contacting the electrode assembly 10. The insulation film 85 may be made of a polymer and may serve to prevent the positive electrode of the electrode assembly 10 and the interior safety member 81 from being electrically connected with each other.

The first end safety member 82 may contact the outer surface of the electrode assembly 10 disposed at one side end of the electrode assemblies 10. The first end safety member 82 may include a first end plate 821 attached to a flat surface 10a on the outside of the electrode assembly 10, and a connection portion 824 formed and connected to the first end plate 821 and attached to the negative uncoated region 12a.

The first end plate 821 and the connection portion 824 may be made of a metal having conductivity, such as copper or stainless steel. The first end plate 821 and the connection portion 824 according to the present exemplary embodiment may be integrally formed, and the connection portion 824 may be formed at one side end of the first end plate 821.

The connection portion 824 may bend toward the negative uncoated region 12a of the neighboring electrode assembly 10. The connection portion 824 may include an inclination portion that bends obliquely from the first end plate 821 and a welding portion that bends from the inclination portion and is formed parallel to the first end plate 821. The connection portion 824 may be welded to the negative uncoated region 12a to be electrically connected with the negative uncoated region 12a and may support the negative uncoated region 12a to prevent the negative uncoated region 12a from wobbling due to external shock or vibration.

An insulating film 85 may be attached to a surface of the first end plate 821 that contacts the electrode assembly 10.

The insulation film 85 may be made of a polymer, and may serve to prevent the positive electrode of the electrode assembly 10 and the first end safety member 82 from being electrically connected with each other.

The second end safety member 83 may be installed to contact the outer surface of the electrode assembly 10 disposed at the other side end of the electrode assemblies 10. The second end safety member 83 may include the second end plate 831 attached to a flat surface 10a on the outside of the electrode assembly 10, and a connection portion 833 formed and connected to the second end plate 831 and attached to the negative uncoated region 12a.

The second end plate 831 and the connection portion 833 may be made of the metal having conductivity, such as copper or stainless steel. The second end plate 831 and the connection portion 833 according to the present exemplary embodiment may be integrally formed, and the connection portion 833 may be formed at one side end of the second end plate 831.

The connection portion 833 may bend toward the negative uncoated region 12a of the neighboring electrode assembly 10. The connection portion 833 may include an inclination portion that obliquely bends from the second end plate 831 and a welding portion that bends from the inclination portion and that is formed parallel to the second end plate 831. The connection portion 833 may be welded to the negative uncoated region 12a to be electrically connected to the negative uncoated region 12a. The connection portion 833 of the second end safety member 83 may be obliquely formed in the direction opposite to the connection portion 824 of the first end safety member 82.

An insulating film 85 may be attached to a surface contacting the electrode assembly 10 in the second end plate 831. The insulation film 85 may be made of a polymer and may serve to prevent the positive electrode of the electrode assembly 10 and the second end safety member 83 from being electrically connected with each other.

In other implementations, the first end safety member 82 and the second end safety member 83 contacting the outer surface of the electrode assemblies 10 disposed at the other side end among the electrode assemblies 10 may be omitted.

As shown in FIG. 9, when a conductive foreign material 60 such as a nail penetrates from the outside of a typical rechargeable battery due to shock or an accident, and when, as a result, the positive electrode and the negative electrode short-circuit each other through the conductive foreign material 60, excessive heat may be generated in the rechargeable battery, which may explode or combust. However, as described in the exemplary embodiment, when the safety member is installed, the interior safety member 81 or the first or second end safety members 82, 83 and the case 134 may short circuit each other. Accordingly, it may be possible to safely discharge the charged current.

According to embodiments, after the positive and negative electrodes 11 and 12 and the separator 13 are spirally wound, the negative electrode 12 may be disposed on the outermost surface of the electrode assemblies 10. Accordingly, each of the interior safety member 41 and the negative electrode 12 may be disposed on the respective sides of the separator 13 to face each other. After penetrating the interior safety member 81 and the negative electrode 12 in sequence, the conductive foreign material 60 may penetrate the positive electrode 11. The safety members 81, 82, 83 may absorb the heat generated between the conductive foreign material 60 and the negative electrode 12, and a inside temperature of the electrode assembly 10 may be suppressed.

The interior safety member 81 may be formed of copper.

As such, according to the exemplary embodiment, when a foreign material such as a nail penetrates to cause a short-circuit, current may be discharged to remove a combustion risk, and the heat may be absorbed by the safety members, thereby improving the safety of the rechargeable battery 102.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery, comprising:
    a plurality of electrode assemblies arranged in a case, each electrode assembly consisting essentially of a first electrode, a second electrode and a separator between the first electrode and the second electrode; and
    an interior safety member in the case, the interior safety member including an interior plate that extends between adjacent ones of the electrode assemblies so as to separate the adjacent ones of the electrode assemblies from each other, the interior plate including oppositely facing surfaces located between outer side surfaces of the adjacent ones of the electrode assemblies, the interior safety member including an insulation film that physically contacts the outer side surfaces of the adjacent ones of the electrode assemblies and insulates the oppositely facing surfaces of the interior plate from the outer side surfaces of the adjacent ones of the electrode assemblies, and the interior safety member further including a first connection portion extending from the interior plate and electrically connected to the second electrode of one of the adjacent ones of the electrode assemblies and a second connection portion extending from the interior plate and electrically connected to the second electrode of an other one of the adjacent electrode assemblies,
    wherein:
       the plurality of electrode assemblies includes a first electrode assembly at one outermost side of the plurality of electrode assemblies and a second electrode assembly at another outermost side of the plurality of electrode assemblies, and
       the battery further includes:
       a first end safety member including a first end plate between the first electrode assembly and a first inner side of the case, and
       a second end safety member including a second end plate between the second electrode assembly and a second inner side of the case.

2. The battery as claimed in claim 1, wherein:
    the second electrode of each of the electrode assemblies includes an active material coated on a metal plate, and
    the metal plate of the second electrode and the interior plate of the interior safety member are formed of a same metal.

3. The battery as claimed in claim 2, wherein the metal plate of the second electrode and the interior plate of the interior safety member are formed of copper.

4. The battery as claimed in claim 3, wherein the first electrode, second electrode and separator of each electrode assembly are wound or stacked together such that an outermost facing electrode of each electrode assembly is the second electrode.

5. The battery as claimed in claim 4, wherein:
the first electrode and the second electrode of each electrode assembly respectively include a first electrode uncoated region and a second electrode uncoated region.

6. The battery as claimed in claim 5, wherein:
the first connection portion projects from an end of the interior plate to electrically connect to the second electrode uncoated region of the one of the adjacent ones of the electrode assemblies and the second connection portion projects from the end of the interior plate to electrically connect to the second electrode uncoated region of the other of the adjacent ones of the electrode assemblies.

7. The battery as claimed in claim 6, wherein the first connection portion and the second connection portion extend from the end of the interior plate along an entire height of the interior plate.

8. The battery as claimed in claim 6, wherein:
the first connection portion and the second connection portion each extend from the end of the interior plate along only a part of an entire height of the interior plate, and
the first connection portion and the second connection portion are spaced apart from each other in a height direction of the interior plate.

9. The battery as claimed in claim 6, wherein:
the first connection portion and the second connection portion of the connection portion have a continuous, serpentine configuration, and
the connection portion includes a connection plate connecting the first connection portion and the second connection portion.

10. The battery as claimed in claim 6, wherein:
the battery includes more than two of the electrode assemblies and a plurality of the interior safety members.

11. The battery as claimed in claim 6, wherein:
the oppositely facing surfaces of the interior plate have a length and height that substantially correspond to a length and height of the outer side surfaces of the adjacent ones of the electrode assemblies.

12. The battery as claimed in claim 6, wherein:
the first end safety member further includes a first end connection portion electrically connected to the second electrode uncoated region of the first electrode assembly, and
the second end safety member further includes and a second end connection portion electrically connected to the second electrode uncoated region of the second electrode assembly.

13. The battery as claimed in claim 12, wherein the first end plate and the second end plate are made of copper.

14. The battery as claimed in claim 12, wherein:
the first end plate and the second end plate each include a facing surface that faces a respective one of the first end one and the second end one of the electrode assemblies, and
the first end plate and the second end plate each have a length and height that substantially correspond to a length and height of the electrode assemblies.

15. The battery as claimed in claim 14, wherein the first end safety member and the second end safety member each include an insulation film that electrically insulates the facing surface of the first end plate and the second end plate from the respective one of the first end one and the second end one of the electrode assemblies.

16. The battery as claimed in claim 15, wherein:
the first electrode of the electrode assemblies is electrically connected to the case, and
the second electrode of the electrode assemblies, the interior safety member, the first end safety member and the second end safety member are electrically insulated from the case.

17. The battery as claimed in claim 16, further including:
a first electrode terminal,
a first current collector electrically connecting the first electrode terminal and the first electrode,
a second electrode terminal, and
a second current collector electrically connecting the second electrode terminal and the second electrode.

18. The battery as claimed in claim 1, wherein:
the case is in a form of a rectangular parallelpiped having two wide sides opposite each other, two narrow sides opposite each other and connecting the two wide sides, a bottom side connected to the two narrow sides and the two wide sides, and an opening at an end opposite to the bottom side, the opening being sealed by a cap plate, the cap plate including a vent member including a notch that is fracturable in response to a predetermined pressure inside the case and an electrolyte injection hole through which an electrolyte is injected into the battery case, the electrolyte injection hole being sealable by a sealing plug,
the first electrode, second electrode and separator of each electrode assembly are spirally wound and compressed to form the outer side surfaces of the electrode assembly as planar surfaces on opposite sides of the electrode assembly, the planar surfaces being connected to each other by curved portions, the electrode assemblies being disposed in the case such that the planar surfaces of the electrode assemblies are parallel to each other and parallel to the wide sides of the case.

* * * * *